United States Patent
Sugimoto et al.

[11] Patent Number: 6,063,418
[45] Date of Patent: May 16, 2000

[54] METHOD AND CONTAINER FOR INSECTICIDALLY STORING GRAINS

[75] Inventors: Teizo Sugimoto, Urayasu; Naoshi Itagaki, Zama; Hiroshi Kimura, Omiya; Eiji Wada, Kawasaki; Naoki Hayashi, Fujisawa; Toshiyuki Takeda; Shiro Yamamoto, both of Yokohama, all of Japan

[73] Assignee: Fujimori Kogyo Co., Ltd., Japan

[21] Appl. No.: 09/077,095

[22] PCT Filed: Dec. 19, 1996

[86] PCT No.: PCT/JP96/03704

§ 371 Date: Jul. 14, 1998

§ 102(e) Date: Jul. 14, 1998

[87] PCT Pub. No.: WO97/22258

PCT Pub. Date: Jun. 26, 1997

[30] Foreign Application Priority Data

Dec. 19, 1995 [JP] Japan .................................. 7-330865

[51] Int. Cl.[7] .................................. A23B 9/00; A23K 3/02
[52] U.S. Cl. .................. 426/127; 426/395; 426/404; 426/410; 426/419; 383/111
[58] Field of Search ...................... 426/395, 404, 426/126, 127, 419, 410; 383/111

[56] References Cited

U.S. PATENT DOCUMENTS

| | | | |
|---|---|---|---|
| 3,922,363 | 11/1975 | Mitsuda et al. | 426/410 |
| 4,224,347 | 9/1980 | Woodruff | 426/106 |
| 4,899,517 | 2/1990 | Shima et al. | 53/432 |
| 4,966,796 | 10/1990 | Aki et al. | 428/343 |
| 5,119,588 | 6/1992 | Timmis et al. | 47/58 |
| 5,597,599 | 1/1997 | Smith et al. | 426/316 |
| 5,616,420 | 4/1997 | Yamaoka et al. | 428/514 |

FOREIGN PATENT DOCUMENTS

| | | |
|---|---|---|
| 48-26516 | 4/1973 | Japan . |
| 49-116246 | 11/1973 | Japan . |
| 1-279812 | 11/1989 | Japan . |
| WO97/22258 | 6/1997 | WIPO . |

*Primary Examiner*—Nina Bhat
*Attorney, Agent, or Firm*—Parkhurst & Wendel, L.L.P

[57] ABSTRACT

A method and a container for long-term storage in a state in which harmful insects do not propagate, in a case in which grains such as unpolished rice or the like are filled and stored. An inner bag (10) made of a flexible material is accommodated in an outer bag (12) which has high-strength. After grains are filled in the inner bag, the inner bag (10) is filled with carbon dioxide gas and is closed. The grains are stored in a state in which harmful insects are exterminated. It is preferable from the standpoint of the insecticidal effect that the inner portion of the inner bag (10) is able to maintain a carbon dioxide gas concentration of 40% or more for 7 days or more. Because the inner bag has the property of a $CO_2$ permeation amount of less than or equal to 6300 $cc/m^2 \cdot 24$ hr 1 atm, an oxygen-deficient state can be maintained.

4 Claims, 7 Drawing Sheets

(A)

(B)

(A)

(B)

RELATIONSHIP BETWEEN CARBON DIOXIDE GAS PERMEATION AMOUNT OF INNER BAG AND CARBON DIOXIDE GAS CONCENTRATION AFTER SEVEN DAYS HAS PASSED

METHOD AND CONTAINER FOR INSECTICIDALLY STORING GRAINS

TECHNICAL FIELD

The present invention relates to a method for insecticidally storing grains and to a container for storing grains in which grains such as unpolished rice, polished rice, or the like can be stored for a long time with harmful insects being exterminated.

BACKGROUND ART

Various types of methods and devices have been proposed for storing grains such as unpolished rice or the like over a long period of time.

The method for packing rice for long-term storage disclosed in Japanese Patent Application Laid-Open No. 48-26516 proposes means for placing rice within a bag and substituting the air within the bag with carbon dioxide gas, sealing the bag with the carbon dioxide gas at a ratio of 0.8 to 0.9 apparent specific gravity within the bag, and drying the rice until there is a low moisture content with the moisture content of the rice and the moisture content of the carbon dioxide gas in equilibrium. However, in this storage means, the principal object is only the moisture content of the rice, and no consideration whatsoever is given to insecticidal action against grain weevils included in the rice. Therefore, the carbon dioxide gas passes through the bag and is dispersed, and in accordance with the decrease in the concentration of the carbon dioxide gas, grain weevils propagate.

Further, Japanese Patent Application Laid-Open No. 49-116246 discloses a method for storing grains or the like in an inert gas atmosphere. It is proposed that grains are filled up in a silo which has an inert gas atmosphere, and are stored for a long time by the pressure, temperature and humidity within the storage tank being adjusted automatically. However, in this invention, the silo, which is a strong structure, is needed. Further, because the silo must be built air-tight, it is impossible to transport. A completely sealed, large equipment is needed, and the manufacturing cost thereof is also expensive.

A method of exterminating harmful insects in stored unpolished rice is disclosed in Japanese Patent Application Laid-Open No. 1-279812. This invention discloses exterminating harmful insects in unpolished rice by creating an atmosphere having a vaporized carbon dioxide gas concentration of 50% or more. However, a large silo which is a strong structure is presupposed as the insecticidal device, and the concentration of the carbon dioxide gas filled therein is extremely great. Therefore, a means for reducing the amount of carbon dioxide gas used is also disclosed.

DISCLOSURE OF THE INVENTION

In view of the aforementioned facts, an object of the present invention is to provide a method for insecticidally storing grains and a container for storing grains which do not require large, strong structural equipment, which are convenient for transport, which use the minimum amount of carbon dioxide gas of a demand, which have effective insecticidal and anti-mold effects, and which are suited for long-term storage.

In a first aspect of the present invention, an inner bag of a flexible material is accommodated within a high-strength outer bag. After grains are filled in the inner bag, the inner bag is filled with carbon dioxide gas and closed, and the grains are stored in a state in which harmful insects are exterminated. In this case, the inner bag may be made to be able to maintain a carbon dioxide gas concentration of 40% or more for seven days or more, and the inner bag may be made of a heat-sealable plastic whose carbon dioxide gas permeation amount is less than or equal to 6300 cc/m$^2$·24 hr·1 atm.

A second aspect of the present invention has an inner bag, which is made of a flexible material and in which grains are filled and which thereafter is filled with carbon dioxide gas and closed, and an outer bag, which is high-strength and accommodates the inner bag. In this case, it suffices to have an inner bag for the filling-in of grains which is made of a flexible material and can maintain a concentration of 40% or more of the filled carbon dioxide gas for seven days or more, and to have an outer bag which is high-strength and accommodates the inner bag. Further, the inner bag may be made of a heat-sealable plastic having a carbon dioxide gas permeation amount of less than or equal to 6300 cc/m$^2$·24 hr·1 atm, and the outer bag may be provided with an engagement member for an engaging body for lifting.

In accordance with the present invention, when grains are stored, an atmosphere cut off from air can be maintained and it is possible to make an oxygen-deficient state. Therefore, grains such as unpolished rice, polished rice, wheat and the like or other grains can be stored over a long period of time in a state in which there is no propagation of harmful insects, and can be lifted up and transported and placed. Therefore, there is the effect that the efficiency in transporting can be improved.

In the present invention, in particular, in case grains are stored, a $CO_2$ concentration of 40% can be maintained for 7 days, and there is the effect of reliably exterminating insects such as grain weevils or the like due to the maintaining of an atmosphere cut off from air and the oxygen-deficient state, and grains can be stored for a long period of time.

The filling of grains in the inner bag in the present invention can be carried out by filling grains in the inner bag after the inner bag has been accommodated in the outer bag, or can be carried out by accommodating the inner bag in the outer bag after the grains have been filled in the inner bag. After grains are filled in the inner bag, the inner bag is sealed and set in an airtight state. This sealing can be carried out by heat fusing by a heat seal or any of various types of sealing means such as an adhesive or a nipping clamp or the like. This sealed portion as well is provided with a $CO_2$ permeation amount which is equivalent to or less than that of the other portions of the inner bag.

DETAILED DESCRIPTION OF THE INVENTION

Figure 1:
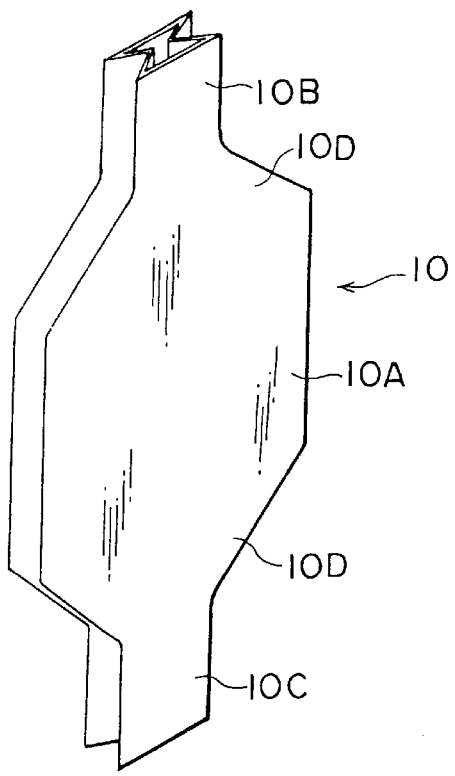
FIG. 1A is a perspective view illustrating an accommodated state of an inner bag.
FIG. 1B is a front view illustrating an accommodated state of the inner bag.
Figure 1:
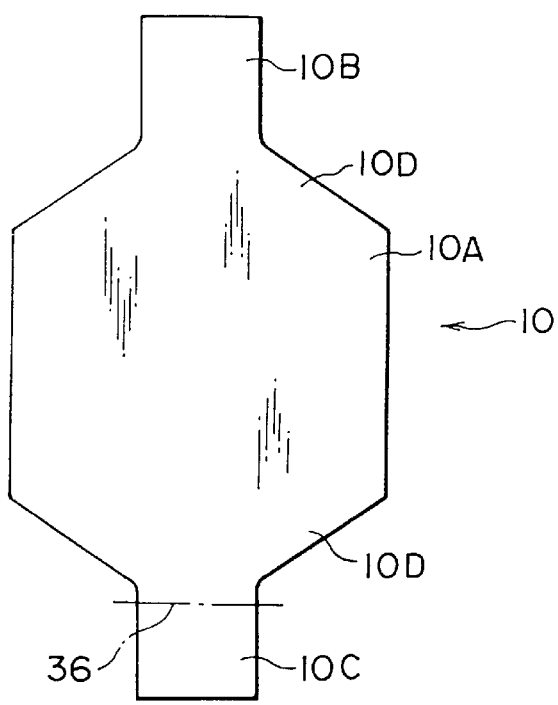
Figure 2:
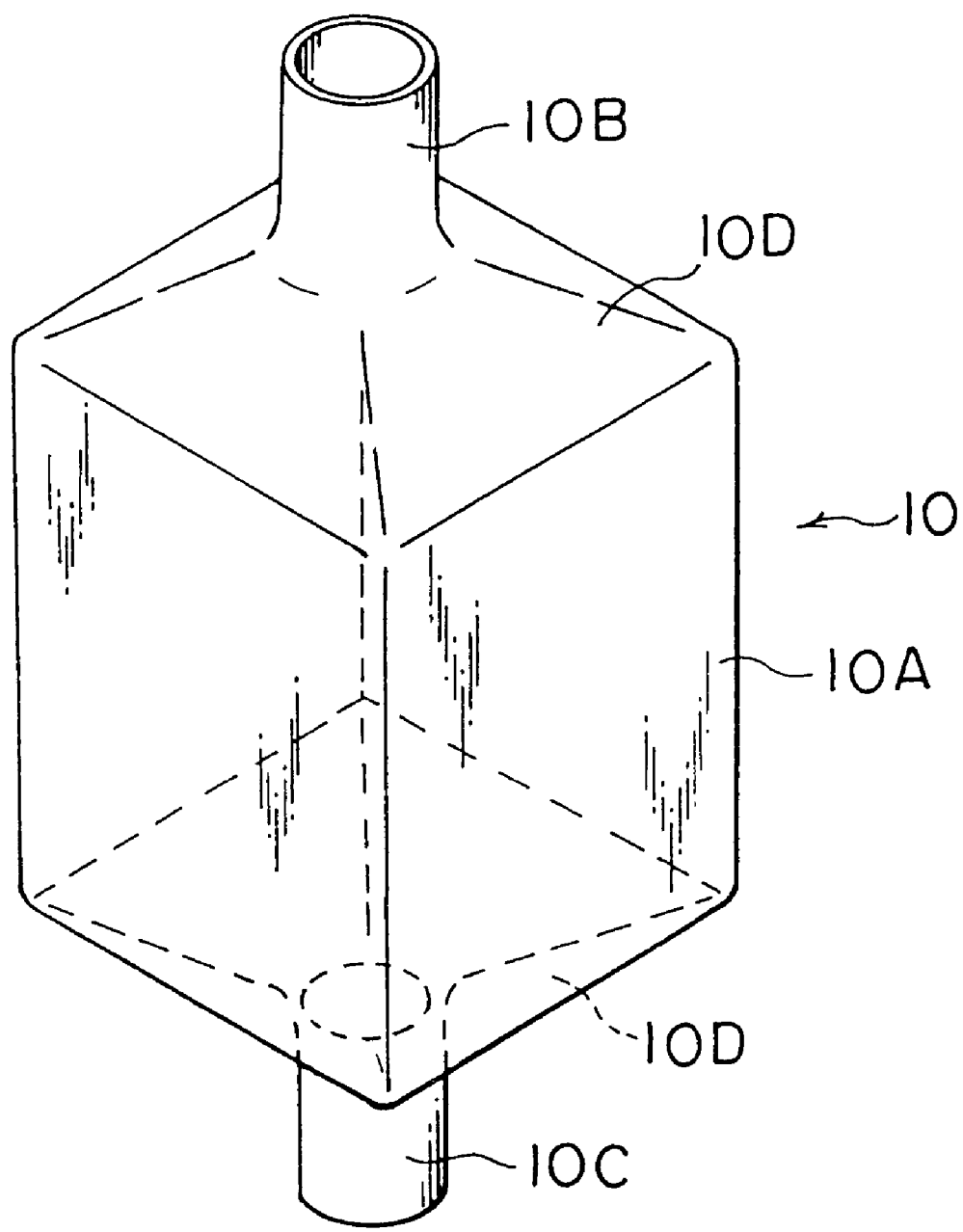
FIG. 2 is a perspective view illustrating an expanded state of the inner bag.

An inner bag 10, which is an inner body for storing grains, is illustrated in FIG. 1A through FIG. 2. States in which the inner bag 10 is accommodated in an outer bag 12, which is an outer body, and unpolished rice 14 is filled in the inner bag 10 are illustrated in FIG. 3 through FIG. 7.

As illustrated in FIG. 1A and FIG. 1B, the inner bag 10 is formed integrally and is stored in a folded-up state. As illustrated in FIG. 2, when the inner bag 10 is in an unfolded and expanded state, a tube portion (enlarged diameter portion) 10A is formed at the central portion. A small tube portion 10B, which serves as an injection spout, and a small tube portion 10C, which serves as a discharge spout, are connected via respective reduced diameter portions 10D, coaxially to the top and the bottom of the tube portion 10A.

The inner bag 10 is formed of a flexible material such as inflation film or the like. These materials have a $CO_2$ permeation amount of less than or equal to 6300 cc/m$^2$·24 hr·1 atm, and the concentration of the $CO_2$ filled in the inner portion is maintained at 40% or more for seven days. In this way, an environment can be provided in which harmful insects adhering to the grains filled in the inner portion, in particular, eggs, larvae, adult insects and pupae of grain weevils die out due to the oxygen-deficient state.

As one example, the amount of unpolished rice filled in the inner bag 10 is 1 ton (volume 1200 to 1300 liters), and the length×width×height dimensions of the inner bag 10 are 900×900×1300 mm, or more.

Figure 3:
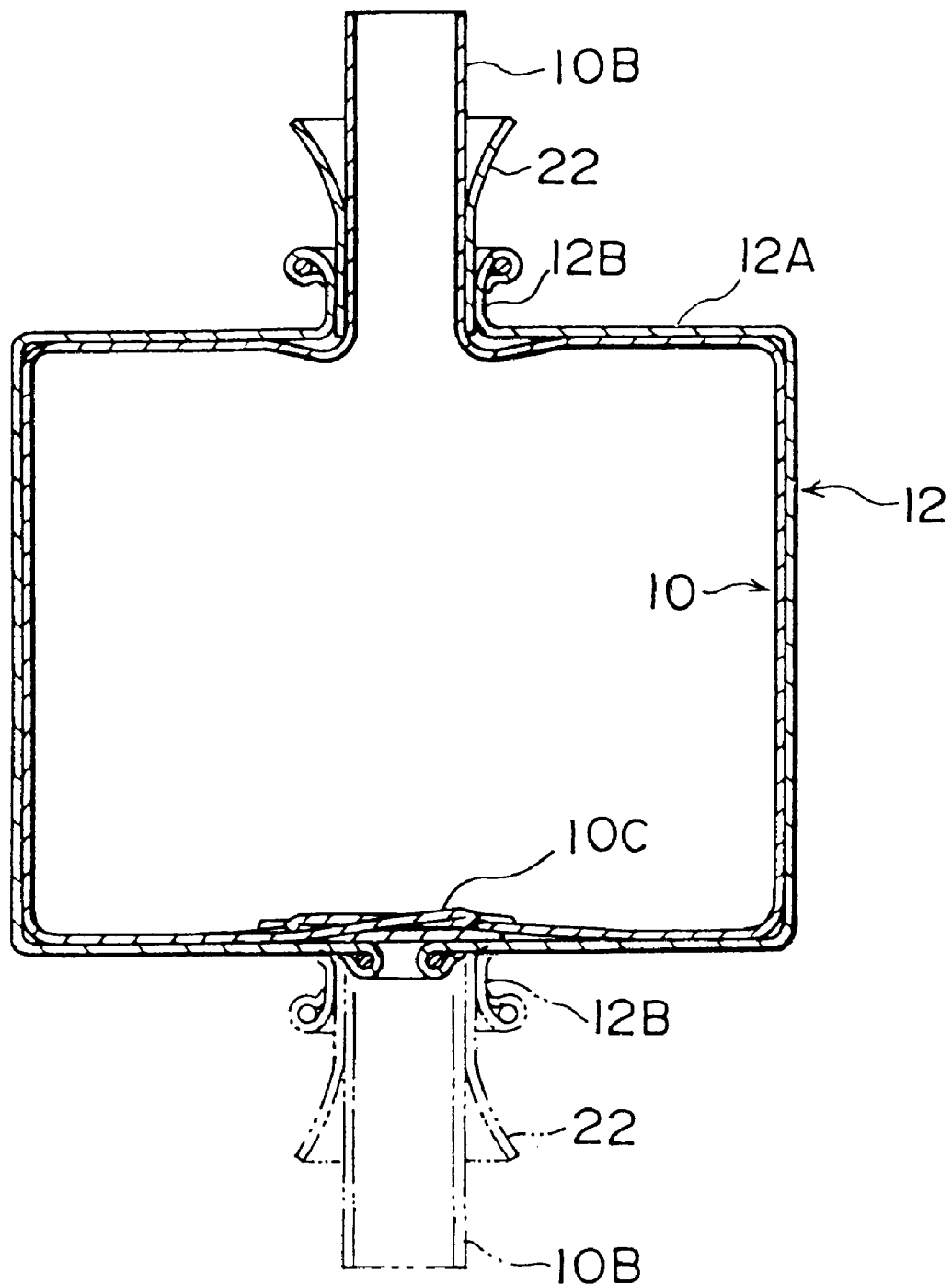
FIG. 3 is a cross-sectional view illustrating an expanded state with the inner bag placed within the outer bag.
Figure 4:
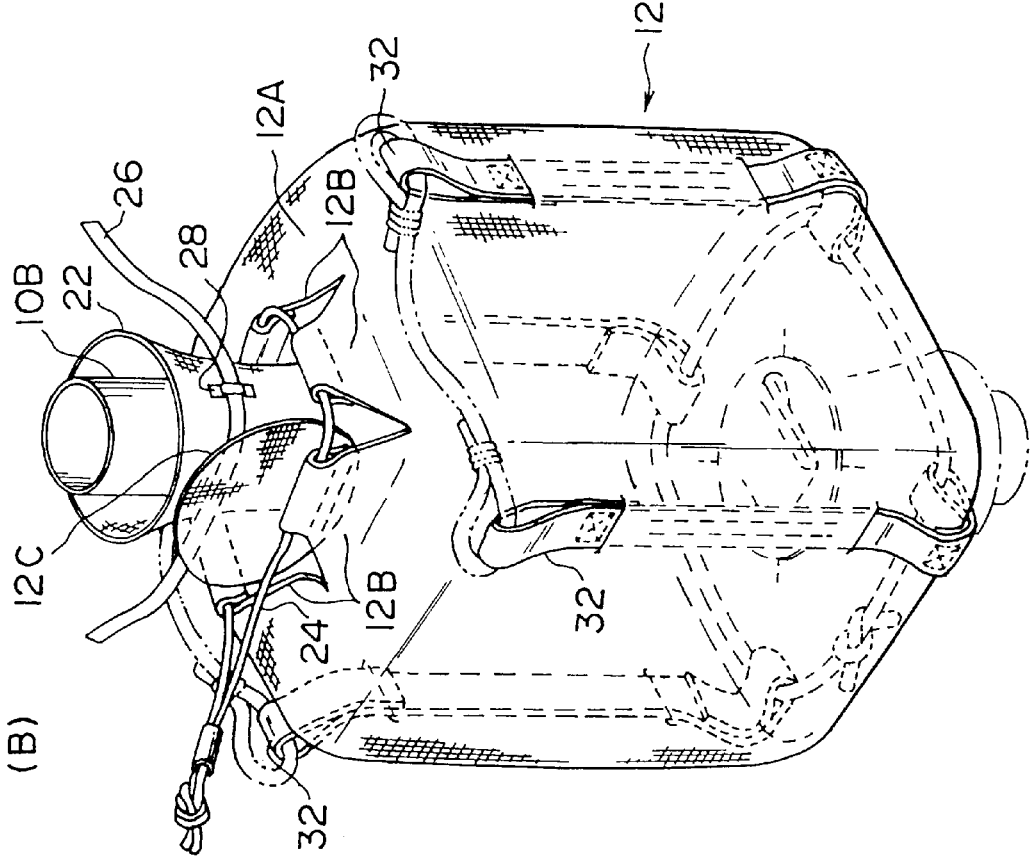
FIG. 4A is a cross-sectional view illustrating a state in which unpolished rice is filled in the expanded inner bag.
FIG. 4B is a perspective view of FIG. 4A.
Figure 4:
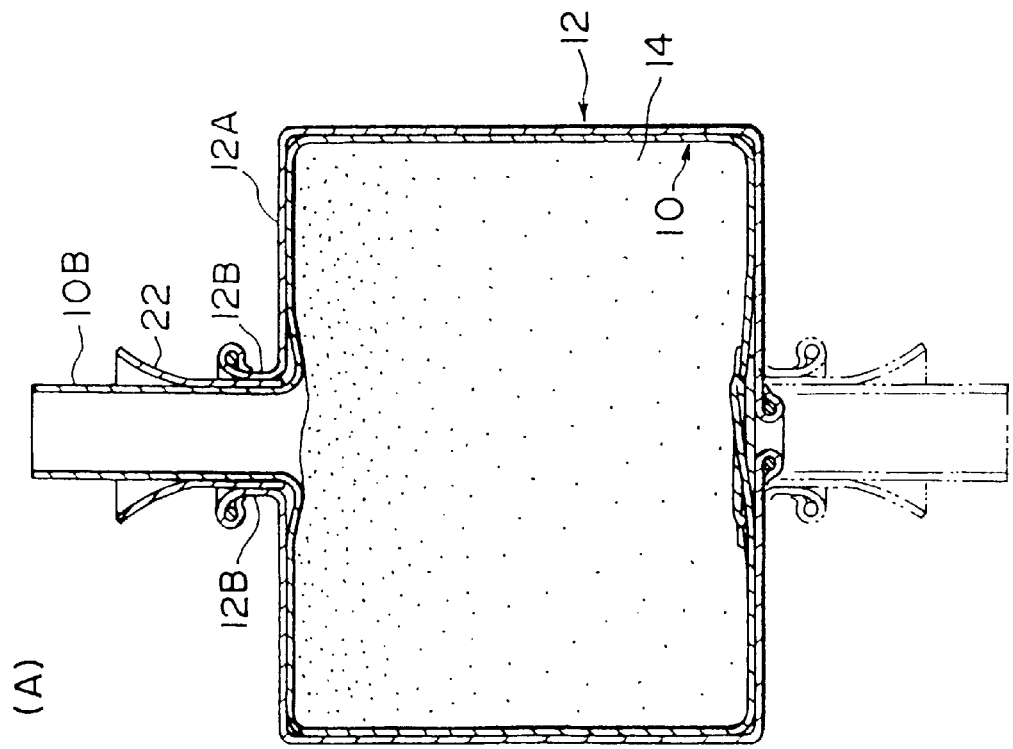
Figure 5:
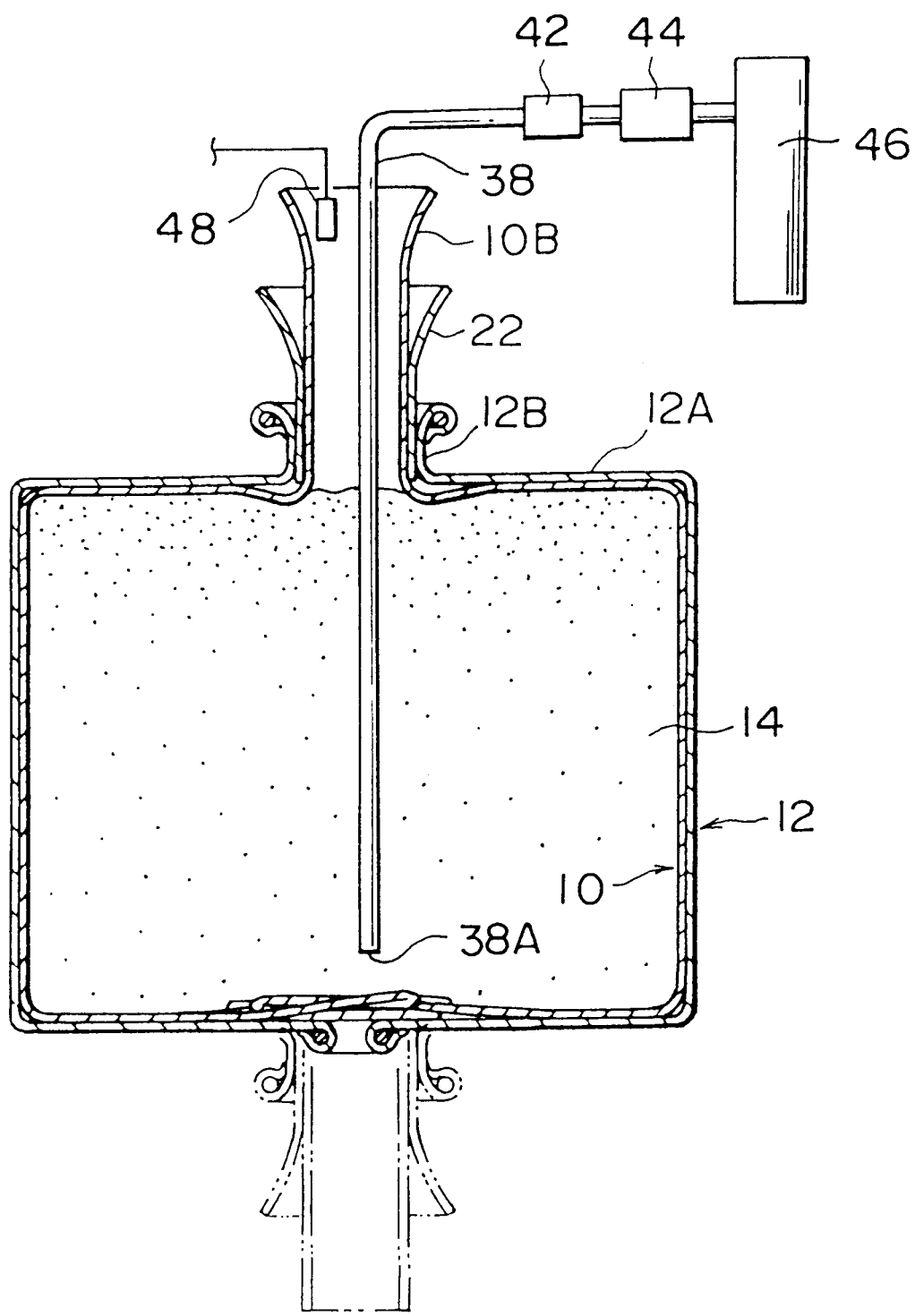
FIG. 5 is a cross-sectional view illustrating a state in which a rigid guiding tube is inserted into the unpolished rice and carbon dioxide is filled.

The outer bag 12 illustrated in FIG. 3 through FIG. 5 is formed of a high-strength material. Synthetic fibers (e.g., a plain weave fabric using polyproylene (PP) flat yarn) are sewn by a sewing machine so that the outer bag 12 is formed in a rectangular box shape. It is preferable that these materials have strength to withstand breakage due to projections from the exterior, tension and shear force when the outer bag 12 is suspended, and compression when stacked in plural layers. The content volume of the outer bag 12 (in particular, the horizontal cross-sectional area and the height) is slightly smaller than the volume of the inner bag tube portion 10A (in particular, the horizontal cross-sectional area and the height). In this way, when unpolished rice is filled in the inner bag 10, the lateral spreading load of the inner bag 10 is supported by the inner walls of the outer bag 12.

As illustrated in FIG. 4A and FIG. 4B, a tubular portion 22 communicates with an opening formed in a central portion of a top portion 12A of the outer bag 12. The lower end outer periphery of the tubular portion 22 is adhered airtightly to the bottom surface of the top portion 12A, and if necessary, is sewn to the top portion 12A. A drawstring 26 is held by engagement portions 28 at the intermediate portion outer periphery of the tubular portion 22. Accordingly, if the drawstring 26 is taken around the outer periphery of the tubular portion 22 and both end portions are pulled and thereafter are tied together, standing portions 12B and the tubular portion 22 are throttled so that the diameters thereof are reduced and the standing portions 12B and the tubular portion 22 are closed.

The distal ends of the plurality of standing portions 12B, which stand up integrally from the periphery of the opening of the top portion 12A, are folded over and sewn. The intermediate portion of a drawstring 24 is inserted through each of these folded-over portions. As a result, in the same way as the drawstring 26, if the drawstring 24 is also taken around the tubular portion 22 and the both end portions are pulled and thereafter tied together, the diameter of the top portion opening can be reduced and the opening can be closed. In this case, by pushing the tubular portion 22, which has already been closed by the drawstring 26, through the top portion opening and into the inner portion of the outer bag 12, the tubular portion 22 does not project upwardly from the top portion. A portion of the vicinity of the outer peripheral portion of a circular cover plate 12C, which is formed of the same material as the outer bag 12, is attached to the standing portion 12B. The cover plate 12C is passed between the plurality of standing portions 12B and on the tubular portion 22 which has been pushed into the inner portion of the outer bag from the top portion opening, and is made to cover. Thereafter, the drawstring 24 is drawn. In this way, the cover plate 12C is disposed at the inner side of the top portion opening whose diameter is reduced and which is closed by the drawstring 24, and the inner bag 10 at the inner side is shielded from the exterior.

The standing portions 12B, the tubular portion 22, the drawstrings 24, 26, and the like are also provided at the bottom portion of the outer bag 12 in the same way as at the top portion 12A, such that the top and bottom of the outer bag 12 have the same structure.

Both end portions of suspension strips 32, which are engagement members, are sewn at appropriate places at the outer portion of the outer bag 12. By using these suspension strips 32, the outer bag 12 can be lifted, transported and set by an engaging body such as a hook or the like provided at a lifting means such as a hoist or a crane or the like. Instead of using the suspension strips 32 as the engagement members, an opening may be formed in a portion of the outer bag 12 and used as an engagement portion for a hook or the like.

Next, a method for storing unpolished rice by the inner bag 10 and the outer bag 12 will be described.

As illustrated in FIG. 1B, at the inner bag 10, heat sealing 36 at the small tube portion 10C is carried out in advance so that the bottom end portion is closed. This heat sealing is carried out by heating the small tube portion 10C by a hot plate or an impulse seal or the like, and closing the small tube portion 10B by heat fusing the material.

Thereafter, this inner bag 10 is inserted via the top portion tubular portion 22 of the outer bag 12 whose bottom portion has been closed in advance by the drawstrings 24, 26. When air is filled in the inner portion, the inner bag 10 expands within the outer bag 12 as illustrated in FIG. 3. The small tube portion 10C which has been heat sealed and the reduced diameter portion 10D are folded flat, and made to run planarly along the bottom surface of the outer bag 12. In this state, as illustrated in FIG. 4A and FIG. 4B, unpolished rice is filled in the inner portion of the inner bag 10 through the small tube portion 10B.

Here, as illustrated in FIG. 5, the rigid guiding tube 38, which has an outer diameter of about 10 mm and is formed from metal such as steel or copper or from a synthetic resin material or the like, is inserted through the small tube portion 10B into the unpolished rice 14. It is preferable that a bottom end portion 38A of the rigid guiding tube 38 is inserted to a vicinity of the bottom portion of the inner bag 10 so that the $CO_2$ easily expels the interior air. A porous closing member such as mesh or the like may be provided at the bottom end portion 38A so that the unpolished rice 14 does not enter into the bottom end portion 38A. A $CO_2$ bomb 46 communicates with the rigid guiding tube 38 via a flow meter 42 and a vaporizer 44. The liquid carbon dioxide from the $CO_2$ bomb 46 becomes gaseous carbon dioxide through the vaporizer 44 and is filled in the inner bag 10. Because the specific gravity of carbon dioxide is greater than that of air, the carbon dioxide is filled between the grains of the unpolished rice within the inner bag 10 while the air remaining in the inner bag 10 is expelled from the small tube portion 10B. By disposing a $CO_2$ sensor 48 at the small tube portion 10B of the inner bag 10, a state in which the inner bag 10 is filled with carbon dioxide can be detected. The $CO_2$ which is supplied into the inner bag 10 does not necessarily have to have a concentration of 100%.

Figure 6:
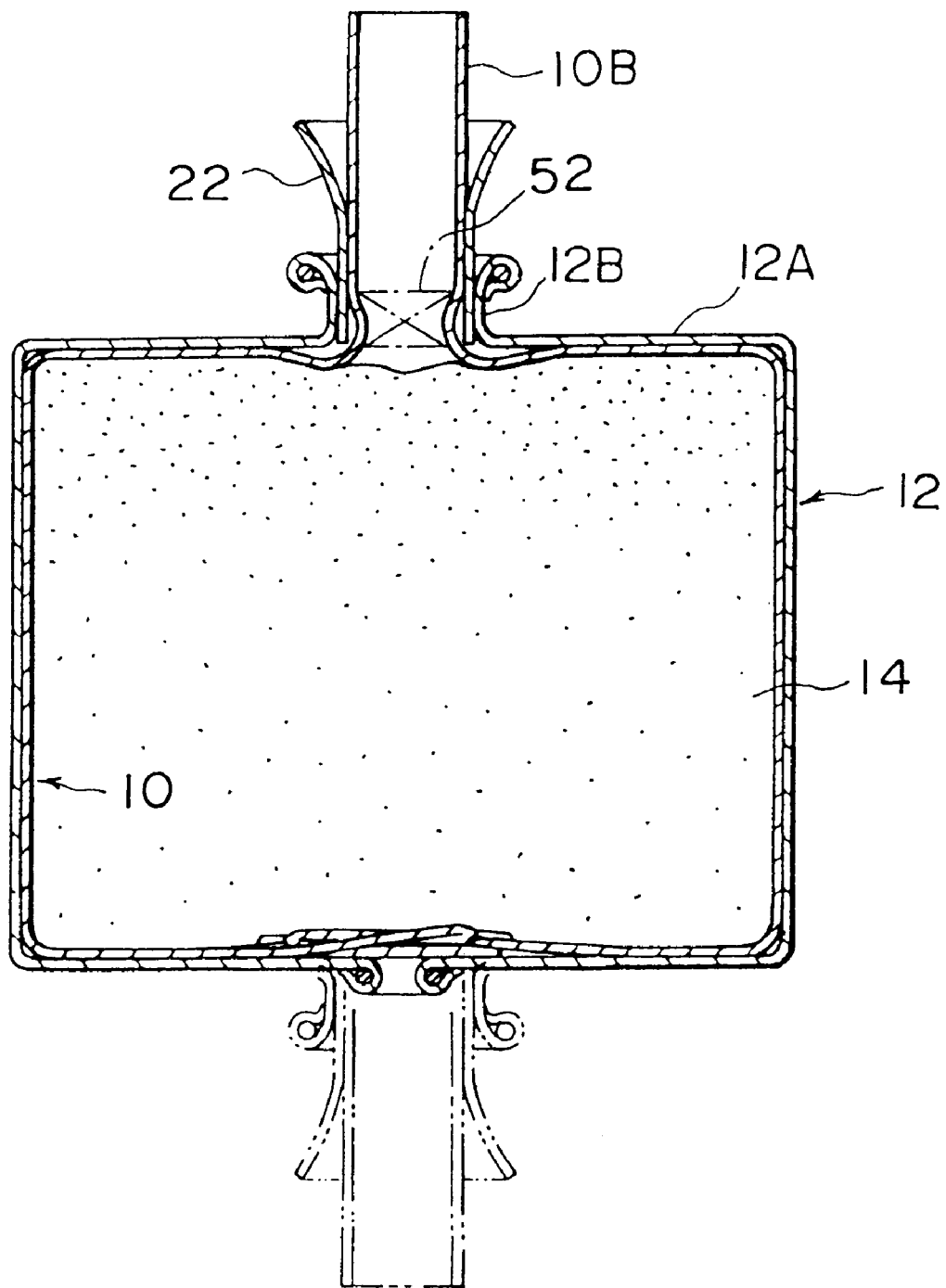
FIG. 6 is a cross-sectional view illustrating a state in which heat sealing is carried out at the inner bag.

Accordingly, when the $CO_2$ which has been filled into the inner bag 10 and risen can be detected by the $CO_2$ sensor 48, the supply of $CO_2$ from the rigid guiding tube 38 is stopped. The rigid guiding tube 38 is pulled out from the unpolished rice 14, and the small tube portion 10B of the inner bag 10 is closed by a heat seal 52 as illustrated in FIG. 6. As one example, in a case in which the weight of the unpolished rice within the inner bag is 150 kg, if the supply of $CO_2$ from the rigid guiding tube 38 is 15 l/min, the inner bag 10 can be filled with $CO_2$ in seven minutes. Thereafter, the small tube portion 10B is pushed into the outer bag 12 through the tubular portion 22. At the outer bag 12, the tubular portion 22 is closed by the drawstring 26, and the tubular portion 22 is pushed into the outer bag 12. By covering with the cover plate 12C and fastening the drawstring 24, the accommodating of the unpolished rice 14 is completed. The outer bag 12, for which the accommodating of the unpolished rice has been completed, can be stacked and stored at an appropriate position within a warehouse by using the suspension strips 32.

When the unpolished rice 14 is to be removed, the outer bag 12 together with the inner bag 10 is raised by holding the suspension strips 32, the drawstrings 26, 24 of the bottom portion of the outer bag 12 are loosened, the tubular portion 22 is opened, and the small tube portion 10C of the inner bag 10 is cut at a portion which is further toward the rectangular tube portion 10A than the heat seal portion. The unpolished rice 14 is discharged through small tube portion 10C and the tubular portion 22 of the bottom portion of the outer bag 12 due to its own weight.

In this way, because the $CO_2$ permeation amount of the inner bag 10 is less than or equal to 6300 cc/m$^2$·24 hr·1 atm, if the filled amount of the unpolished rice 14 is one ton or less, the amount of carbon dioxide gas filled between the grains of unpolished rice is about 750 liters, and the inner portion can be maintained for seven days at an atmosphere having a carbon dioxide gas concentration of 40% or more. As a result, a condition in which harmful insects such as grain weevils or the like in the unpolished rice 14 die out in an oxygen-deficient state can be maintained, and thereafter, long-term storage is possible.

Table 1 illustrates results of storage of Examples and Comparative Examples using inner bags having various $CO_2$ permeation amounts. In Example 1, the inner bag is formed of a linear low density polyethylene (LLDPE) film, and the outer bag is a plain weave woven fabric in which polypropylene (PP) flat yarns of a thickness of 1500 deniers (D) are woven 15 yarns per inch both horizontally and vertically. The outer bags of Examples 2 and 3 and Comparative Example 2 are the same as that of Example 1. In Example 2, the inner bag is a five-layer structure formed by extrusion inflation molding. The intermediate layer is an ethylene-vinyl alcohol copolymer (EVOH) layer having a thickness of 10 $\mu$m. On both sides thereof are adhesive (AD) layers having a thickness of 5 $\mu$m, and at the sides thereof are linear low density polyethylene (LLDPE) layers having a thickness of 30 $\mu$m. The inner bag of Example 3 is a three-layer structure which is a layered film in which the intermediate layer is an aluminum (AL) foil having a thickness of 10 $\mu$m. On one side thereof, there is a 25 $\mu$m thick polyester (E) layer, and on the other side thereof, there is a 50 $\mu$m thick low density polyethylene (LD) layer. The length×width×height dimensions of the outer bags are 450×450×750 mm and of the inner bags are 480×480×800 mm. In the Examples and the Comparative Examples, 110 kg of California rice was filled, and carbon dioxide gas was filled for 7 minutes at a rate of 15 liters per minute, and the opening portion was heat sealed. The $CO_2$ permeation amount was measured in accordance with the gas permeation amount test method of Japanese Industrial Standard, K7126.

Figure 7:
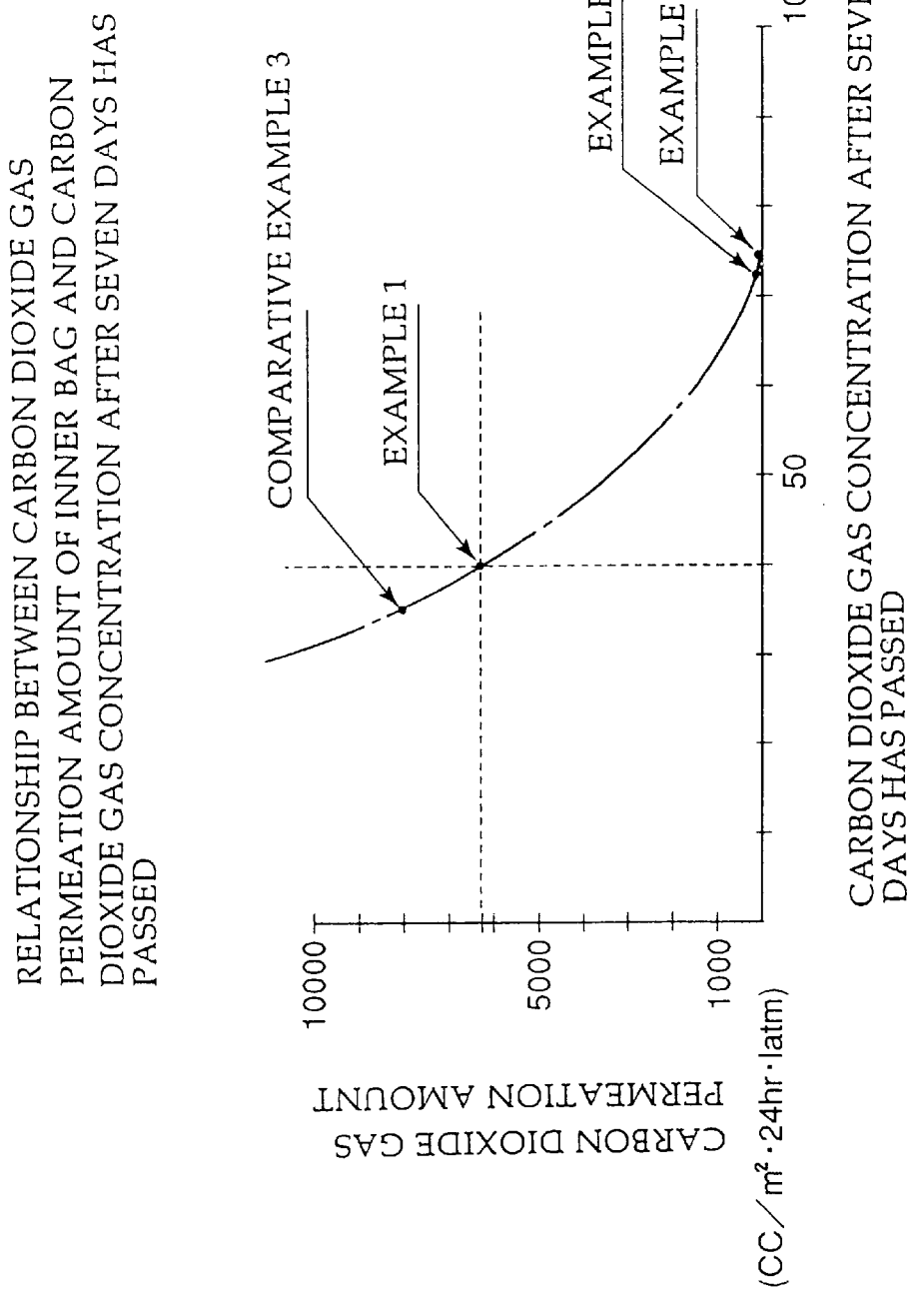
FIG. 7 is a graph illustrating the relationship between the carbon dioxide gas permeation amount of the inner bag and carbon dioxide gas concentration after seven days has passed, in Examples and a Comparative Example.

In all of Examples 1 through 3, the condition of 40% concentration of carbon dioxide gas being maintained for seven days was satisfied. While the carbon dioxide gas was filled, the grain weevils (in the four stages of adult insect, larva, pupa and egg) in the inner bag all died out. Propagation of grain weevils was not observed for 60 days or more thereafter. In Comparative Example 1, there was no inner bag, and the outer bag did not have a carbon dioxide gas shielding effect. Therefore, the grain weevils (in the four stages) could not be exterminated, and a large amount propagated. In Comparative Example 3, because the carbon dioxide gas shielding effect was insufficient, the grain weevils could not be completely exterminated. Further, in Examples 2 and 3, due to the carbon dioxide gas concentration of 40% being maintained for 60 days, during that time, there was no propagation of mold or the like, and the anti-fungal and anti-mold effects were also maintained. As illustrated in FIG. 7, a film in which the carbon dioxide gas permeation amount exceeds 6300 cc/m$^2$·24 hr·1 atm cannot maintain an environment of a carbon dioxide gas concentration of 40% or more for seven days. Therefore, by storing unpolished rice by using a film having a carbon dioxide gas permeation amount of less than or equal to 6300 cc/m$^2$·24 hr ·1 atm, the unpolished rice can be stored for a long period of time in an insecticidal state.

For the material of the inner bag 10 of the present invention, in addition to the above-described materials, a structure may be used in which a polyvinylidene chloride (PVDC) or a polyethylene layer is used on the inner side, and integrally therewith, an aluminum metallized film is used at the outer side. Or, any material which is a material having the above-described carbon dioxide permeation amount can be used.

The inner bag may be formed by superposing a plurality of the single-layer inner bags such as that of above-described Example 1 or by superposing a plurality of multi-layer inner bags such as that of Example 2. Further, the inner bag may be formed by superposing a plurality of single-layer and multi- layer inner bags. In these cases, respective portions thereof may be adhered together at portions by heat fusing or the like.

POTENTIAL USE IN THE INDUSTRY

As described above, the present invention can store grains for a long time in a state in which harmful insects die out, and can improve the transport efficiency. Therefore, the present invention is useful for businesses of storing, transporting and selling grains.

TABLE 1

|  |  | Inner Bag | Outer Bag |
|---|---|---|---|
| Example 1 | Materials | LLDPE | PP Woven Bag |
|  | Standards | Thickness 150 μm | 1500D, 15 × 15/inch |
|  | Volume | 150 liters | 150 liters |
|  | $CO_2$ permeation amount | 6300 cc/m$^2$ · 24 hr · 1 atm |  |
| Example 2 | Materials | LL/AD/EVOH/AD/LL | PP Woven Bag |
|  | Standards | Thickness 30/05/10/05/30 μm | 1500D, 15 × 15/inch |
|  | Volume | 150 liters | 150 liters |
|  | $CO_2$ permeation amount | 10 cc/m$^2$ 24 hr · 1 atm |  |
| Example 3 | Materials | E/AL/LD | PP Woven Bag |
|  | Standards | Thickness 25/10/50 μm | 1500D, 15 × 15/inch |
|  | Volume | 150 liters | 150 liters |
|  | $CO_2$ permeation amount | 0 cc/m$^2$ · 24 hr · 1 atm |  |
| Comparative Example 1 | Materials | None | PP Woven Bag |
|  | Standards |  | 1500D, 15 × 15/inch |
|  | Volume |  | 150 liters |
| Comparative Example 2 | Materials | LLDPE | None |
|  | Standards | Thickness 150 μm |  |
|  | Volume | 150 liters |  |
|  | $CO_2$ permeation amount | 6300 cc/m$^2$ · 24 hr · 1 atm |  |
| Comparative Example 3 | Materials | LLDPE | PP Woven Bag |
|  | Standards | Thickness 100 μm | 1500D, 15 × 15/inch |
|  | Volume | 150 liters | 150 liters |
|  | $CO_2$ permeation amount | 8400 cc/m$^2$ · 24 hr · 1 atm |  |

TABLE 2

|  | Maintenance of Carbon Dioxide Gas Concentration | Insecticidal Effect | Anti-Fungal Effect for 60 Days | Suited for Transport |
|---|---|---|---|---|
| Example 1 | 40% 7 days | Yes | No | Yes |
| Example 2 | 40% 60 days | Yes | Yes | Yes |
| Example 3 | 40% over 60 days | Yes | Yes | Yes |
| Comparative Example 1 | No maintenance ability | No | No | Yes |
| Comparative Example 2 | 40% 7 days | Yes | No | No |
| Comparative Example 3 | 33% 7 days | No | No | Yes |

We claim:

1. A method for insecticidally storing grains comprising:
   filling grains in an inner bag that is accommodated within a high strength outer bag, said inner bag capable of maintaining a carbon dioxide gas concentration of at least 40% for at least 7 days;
   filling said grain-filled inner bag with carbon dioxide;
   closing said carbon dioxide- and grain-filled inner bag; and
   storing said grains wherein insects harmful to said grains are exterminated.

2. A method for insecticidallty storing grains according to claim 1, wherein the inner bag is made of a heat-sealable plastic having a carbon dioxide gas permeation amount of less than or equal to 6300 cc/m$^2$·24 hr·1 atm.

3. A container for insecticidally storing grains comprising:
   an inner bag in which grains are filled, said inner bag being made of a flexible material and being able to maintain for 7 days or more a 40% or greater concentration of carbon dioxide gas filled therein; and
   an outer bag having high-strength and accommodating said inner bag.

4. A container for insecticidally storing grains comprising:
   an inner bag made of a heat-sealable plastic having a carbon dioxide permeability of no more than 6300 cc/m$^2$·24 hr·1 atm and
   a high strength outer bag that accommodates said inner bag and is provided with an engagement member for an engaging body for lifting.

* * * * *